Oct. 2, 1945.  R. C. AYRES  2,386,084
METHOD AND MEANS OF REMOVING STATIC CHARGE FROM MOVING BODIES
Filed Oct. 4, 1943  2 Sheets-Sheet 1

INVENTOR.
Ralph C. Ayres
BY
ATTORNEY.

Oct. 2, 1945.       R. C. AYRES       2,386,084
METHOD AND MEANS OF REMOVING STATIC CHARGE FROM MOVING BODIES
Filed Oct. 4, 1943     2 Sheets-Sheet 2

INVENTOR.
Ralph C. Ayres
BY
ATTORNEY.

Patented Oct. 2, 1945

2,386,084

UNITED STATES PATENT OFFICE 2,386,084

METHOD AND MEANS OF REMOVING STATIC CHARGE FROM MOVING BODIES

Ralph C. Ayres, Kansas City, Kans., assignor to Transcontinental & Western Air, Inc., Kansas City, Mo., a corporation of Delaware Application October 4, 1943, Serial No. 504,840

11 Claims. (Cl. 175—264)

This invention relates to auxiliary apparatus for use on moving bodies, particularly airplanes, and has for its primary object the provision of method and means of removing static charges from the body of the aircraft without creating objectionable noises or sounds in the nature of those that might interfere with the efficient operation of the radio equipment carried by the aircraft.

One of the important aims of this invention is to provide novel, unique, inexpensive, effective and quickly installable apparatus for aircraft, the function whereof is to control the discharge rate and the discharge polarity of the static charge established in the body or parts of the airplane during flight.

One of the salient objects of this invention is the provision of equipment of the aforementioned character, that is capable of controlling the discharge of static electricity from aircraft to insure an even, quiet removal of the static charge when the same has been built up to a point where escape of the electro-static charge without the employment of parts embodying this invention would be detrimental to the efficient operation of any radio communicating instruments carried by the craft.

Other objects of this invention include the provision of means for removing electro-static charges from aircraft having a plurality of discharged elements located for uniform neutralization of the charged air trailing the aircraft without regard to the potential gradient at the point of attachment of the discharge elements.

A still further aim of the invention is the provision of attachable equipment for aircraft useful in the removal of electro-static charges therefrom, that creates an artificial potential gradient at the zones of discharge; and that automatically supples a potential to a control electrode which is of correct polarity and substantially the correct desirable magnitude that utilizes the intensity of the charge in the zone of charged atmosphere behind the aircraft to govern the speed of removal of the static charge from the craft, and to supply a potential to the control electrodes, to cooperate with a discharge element utilizing liquid which is emitted into the slip stream of the aircraft.

Additional objects of the invention include the manner of forming and placing the related control electrodes of the system with respect to the discharge nozzles thereof, and the way in which pick-up probes are carried by the aircraft to have their free ends in the zone of charged atmosphere.

Minor objects will appear during the course of the following specification, referring to the accompanying drawings wherein.

Figure 1:
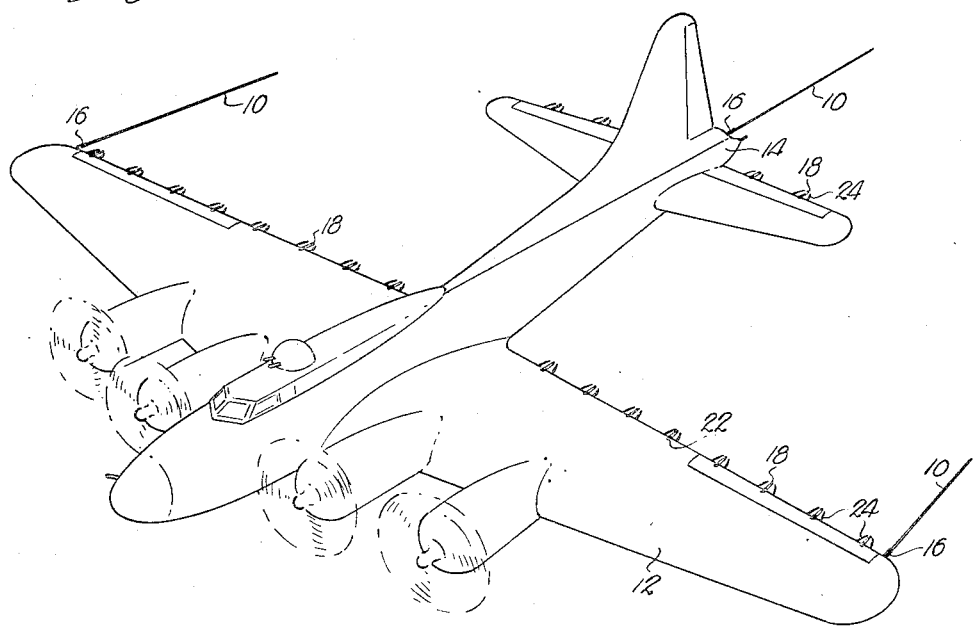
Fig. 1 is a perspective diagrammatical view of an airplane having as a part thereof means for removing static charges from the plane body and made in accordance with the present invention.
Figure 2:
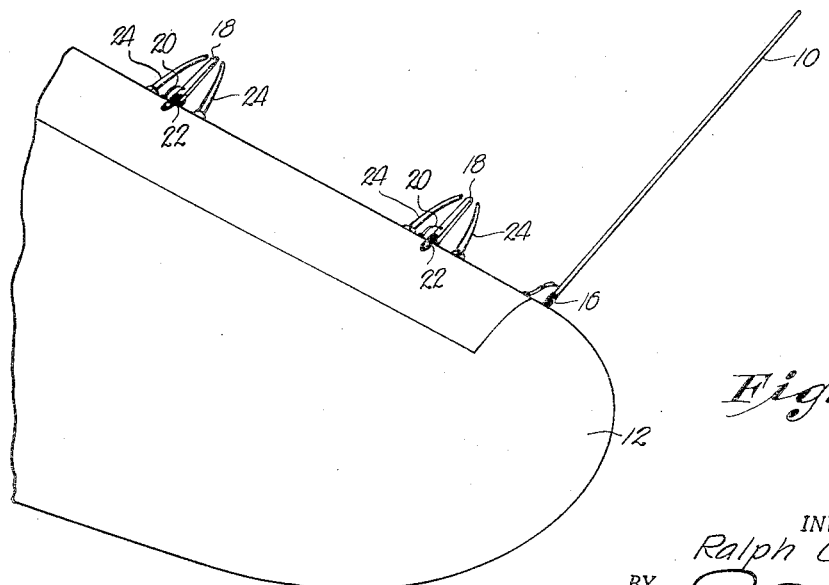
Fig. 2 is an enlarged detailed perspective view of one of the wing tips of the airplane, illustrating the manner of mounting a probe and the control electrode with discharge nozzles.

Past experience has taught that the escape of electro-static charges from aircraft will cause objectionable interference in the radio equipment carried by such craft, and much effort has been expended in an attempt to control the removal of electro-static charges in a manner that will not so interfere. It has been found that controlling the discharge in an automatic manner, governed by the intensity of the zone of charged atmosphere trailing the aircraft and a distribution of the control elements, will result in an even removal of the static charge without interfering noises. Neutralization of the charged volume immediately behind the airplane is also desirable and possible through the employment of the means shown in the accompanying drawings.

One of the preferred embodiments, capable of fulfilling the objects above set forth, comprises a number of probes 10, metallic in nature and capable of absorbing a charge from the atmosphere behind the aircraft. These probes are rearwardly extended to have their free ends within the aforesaid zone and may be mounted on the trailing edges of wings 12 of the aircraft or on tail structure 14, so long as the mounting is through the medium of insulating members 16. Trailing wires or rigid rods may be employed and all of the probes 10 are connected to one or more control electrodes 18 through the medium of wires or analogous members 20.

Control electrodes 18 are each affixed to some portion of the aircraft from which the electrostatic charge is to escape. Attachment of control electrodes 18 should be such as to entirely insulate them from the aircraft, and therefore, specially formed brackets 22 should be used.

Conductors 20 interconnecting probes 10 with control electrodes 18 must likewise be thoroughly and completely insulated from the aircraft, to the end that a separate electrical system comprising control electrodes 18 and conductors 20 is created. Control electrodes should, obviously, be of conducting material and may be of any form so long as the free ends thereof lie in proximity to the discharge nozzle of special type about to be described.

In practice, the length of control electrodes has been found satisfactory if maintained within the range of from four to six inches, with a width of approximately one-fourth inch. A plurality of control electrodes should be used, the number, of course, being variable to suit conditions, type of aircraft equipment, and material from which the craft is constructed.

Figure 4:
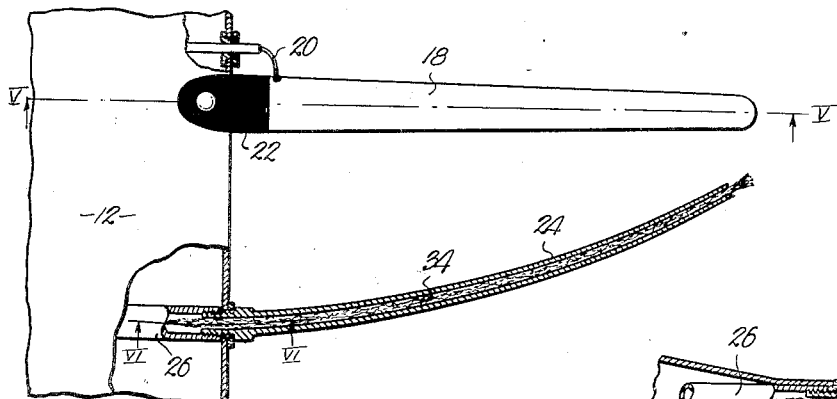
Fig. 4 is a fragmentary detailed sectional view illustrating the disposition and relation of the control electrodes and discharge nozzles.
Figure 6:
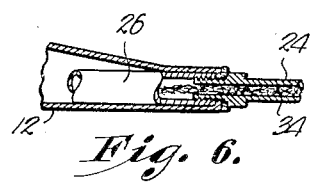
Fig. 6 is a sectional view taken on line VI—VI of Fig. 4.
Figure 5:
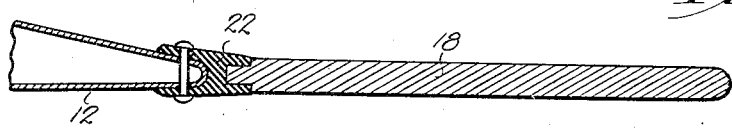
Fig. 5 is a fragmentary sectional view taken on line V—V of Fig. 4.
Figure 3:
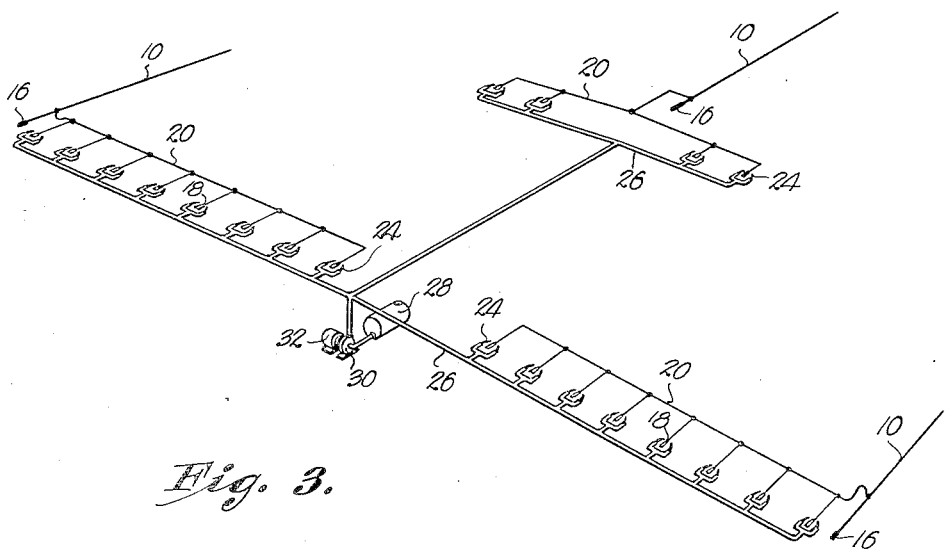
Fig. 3 is a perspective schematic illustration of the static removing means, showing the same entirely separated from association with the aircraft.

The discharge nozzle 24 is tubular in character with an open outer end disposed adjacent to the free end of control electrode 18. This nozzle 24 is preferably made of conducting material and attached directly to the aircraft, such as to the wing 12 thereof, in a manner disclosed in Fig. 4.

There is a discharge nozzle for each control electrode 18 and a conduit 26 places each discharge nozzle 24 in communication with a reservoir 28. A pump 30 operated by a motor or other means 32, insures a constant supply of liquid to discharge nozzle 24.

A wick 34 filling the major portion of the length of discharge nozzle 24 has been found practical because the outer end of wick 34 may be extended into the slip stream of the aircraft for the purpose of withdrawing moisture therefrom. The distance between the projected end of wick 34 and the free end of control electrode 18 should be from one-fourth to one-half inch, and the means for supplying liquid to wick 34 need only be sufficient to maintain the same in a moist condition at all times.

The simplicity and ruggedness of the means for effecting even and controlled removal of the electrostatic charge from the aircraft is advantageous in that very little weight is added and little or no attention is exacted of the crew to maintain the system in operation.

The method of removing the static charge from the aircraft with which the aforesaid means is associated, becomes obvious when the operation is understood.

Probes 10 collect a charge from the zone of charged atmosphere behind the aircraft and into which the probes are projected. The intensity of the absorbed charge, which is transmitted through conductors 20 to electrodes 18, varies with the intensity of the electrostatic charge in the atmosphere behind the craft and this intensity of charge governs the speed of removal of the static charge from the craft. The charge which is absorbed by probes 10 is carried to the several control electrodes 18, and assuming that the control electrode 18 is positively charged and the aircraft is negatively charged electrostatically, the control electrode 18 will attract the negatively charged liquid from the free end of discharge nozzle 24 at a rate of speed that varies as the intensity of positive charge of electrode 18 fluctuates. So long as control electrodes 18 are positively charged through probes 10 and conductors 20, a charge of opposite polarity will be attracted from the aircraft through the liquid in nozzle 24 and wick 34. The charged liquid will be swept from discharge nozzle and wick 24 and 34 respectively by the slip stream of the aircraft, and therefore, as fast as liquid is emitted from discharge nozzle 24, a conducting medium having the ability to respond to the attraction of the proximal control electrode 18 will be presented and the electro-static charge of the aircraft will be evenly drawn off and at a controlled rate by the attraction of control electrodes 18.

The discharged polarity is obviously controlled by the polarity of electrodes 18 for they will attract a charge of opposite polarity from aircraft through the liquid emitted by nozzles 24 and at a rate commensurate with the power of attraction set up in electrodes 18 by the intensity of the static charge in the atmosphere behind the craft and in which probes 10 are disposed. Control electrodes 18 will not carry off any of the electrostatic charge of the aircraft but will control the removal of such charge therefrom through the cooperation with nozzles 24. So long as the electrodes 18 and nozzles 24 are in proximity to each other, as it is contemplated they must be to present an operative installation, the electro-static charge of the aircraft will be drawn off in a smooth manner without being built up to a point where discharge shall produce the noises so detrimental to the efficient use of communicating instruments on the aircraft.

It is realized that each installation may require some alteration in the physical properties and form of the elements, above described and illustrated in the accompanying drawings, but such changes as may become necessary will not preclude their embodying the invention as defined in the appended claims.

Having thus described the invention, what is claimed as new and desired to be secured by Letters Patent is:

1. The method of removing static charge from an aircraft which consists in the steps of collecting a charge from the zone of charged atmosphere behind the aircraft; conducting said charge to electrodes mounted upon the aircraft; and discharging electrically charged liquid from the aircraft adjacent to each electrode.

2. The method of removing static charge from an aircraft which consists in the steps of collecting a charge from the zone of charged atmosphere behind the aircraft; conducting said charge to electrodes mounted upon the aircraft; and discharging electrically charged liquid under the influence of the slip stream of the aircraft adjacent to each electrode respectively.

3. The method of removing static charge from an aircraft which consists in the steps of collecting a charge from the zone of charged atmosphere behind the aircraft; conducting said charge to electrodes mounted upon the aircraft; and discharging liquid from points adjacent to the electrodes and in contact with the aircraft to carry off the static charge thereof at a rate controlled by the potential of the electrodes.

4. The method of removing static charge from an aircraft which consists in the steps of collecting a charge from the zone of charged atmosphere behind the aircraft; conducting said charge to electrodes insulated from the aircraft but mounted thereon; and discharging liquid at points adjacent to the electrodes after bringing the liquid into contact with the aircraft for a sufficient interval to pick up the static charge generated therein.

5. The method of removing static charge which has been generated in an aircraft by its movement through the atmosphere, which consists in the steps of collecting an electrical charge behind the aircraft; conducting said charge to electrodes on the aircraft while maintaining the charge insulated from the said aircraft; and discharging liquid from points in contact with the aircraft at stations adjacent to each of said electrodes to create a potential gradient at the said several points along the trailing edges of the aircraft and to attract a charge of opposite polarity than the zone of charged atmosphere from the aircraft.

6. Means for removing static charge from aircraft, comprising an element in electrical contact with the aircraft and adapted to conduct the static charge therefrom as the same is generated during flight; a control electrode adjacent to the said element; and a conductor in connection with the electrode to supply an electrical charge thereto, said element and the control electrode being in the slip stream of the aircraft, said conductor being formed to absorb static electrical charge from the charged zone of atmosphere near the aircraft.

7. Means for removing static charge from aircraft, comprising an element in electrical contact with the aircraft and adapted to dissipate the static charge therefrom; a control electrode adjacent to the said element; a conductor in connection with the electrode to supply a charge thereto; and a probe attached to the conductor and disposed in the charged zone of the atmosphere near the aircraft, said element and the control electrode being in the slip stream of the aircraft.

8. Means for removing static charge from aircraft, comprising an element in electrical contact with the aircraft and adapted to dissipate the static charge therefrom; a control electrode adjacent to the said element; a conductor in connection with the electrode to supply a charge thereto; and a probe attached to the conductor and disposed in the charged zone of the atmosphere near the aircraft, said electrode, said conductor and said probe all being electrically insulated from the aircraft and disposed in the slip stream thereof.

9. Means for removing static charge from aircraft, comprising an element in electrical contact with the aircraft and adapted to dissipate the static charge therefrom; a control electrode adjacent to the said element; a conductor in connection with the electrode to supply a charge thereto; and a probe attached to the conductor and disposed in the charged zone of the atmosphere near the aircraft, said element for dissipating the static charge having means for emitting a charge-carrying fluid.

10. Means for removing static charge from aircraft, comprising an element in electrical contact with the aircraft and adapted to dissipate the static charge therefrom; a control electrode adjacent to the said element; a conductor in connection with the electrode to supply a charge thereto; and a probe attached to the conductor and disposed in the charged zone of the atmosphere near the aricraft, said element for dissipating the static charge having means for emitting a charge-carrying fluid, said charge in the fluid being a part of the static charge of the aircraft and of a polarity opposite to the polarity of the charge of the electrode.

11. Means for removing static charge from aircraft, comprising an element in electrical contact with the aircraft, carried thereby in the slip stream thereof, and adapted to conduct the static charge therefrom; and a control electrode mounted on the aircraft, in its slip stream, adjacent to the said element, and having connection with a charged zone of atmosphere near the aircraft, said control electrode having its end adjacent to the end of the element and formed to present a relatively large radius of curvature.

RALPH C. AYRES.